W. STENDER.
BOTTLE FEEDING MECHANISM FOR ANNEALING OVENS.
APPLICATION FILED JUNE 4, 1918.
1,339,834.
Patented May 11, 1920.
2 SHEETS—SHEET 1.
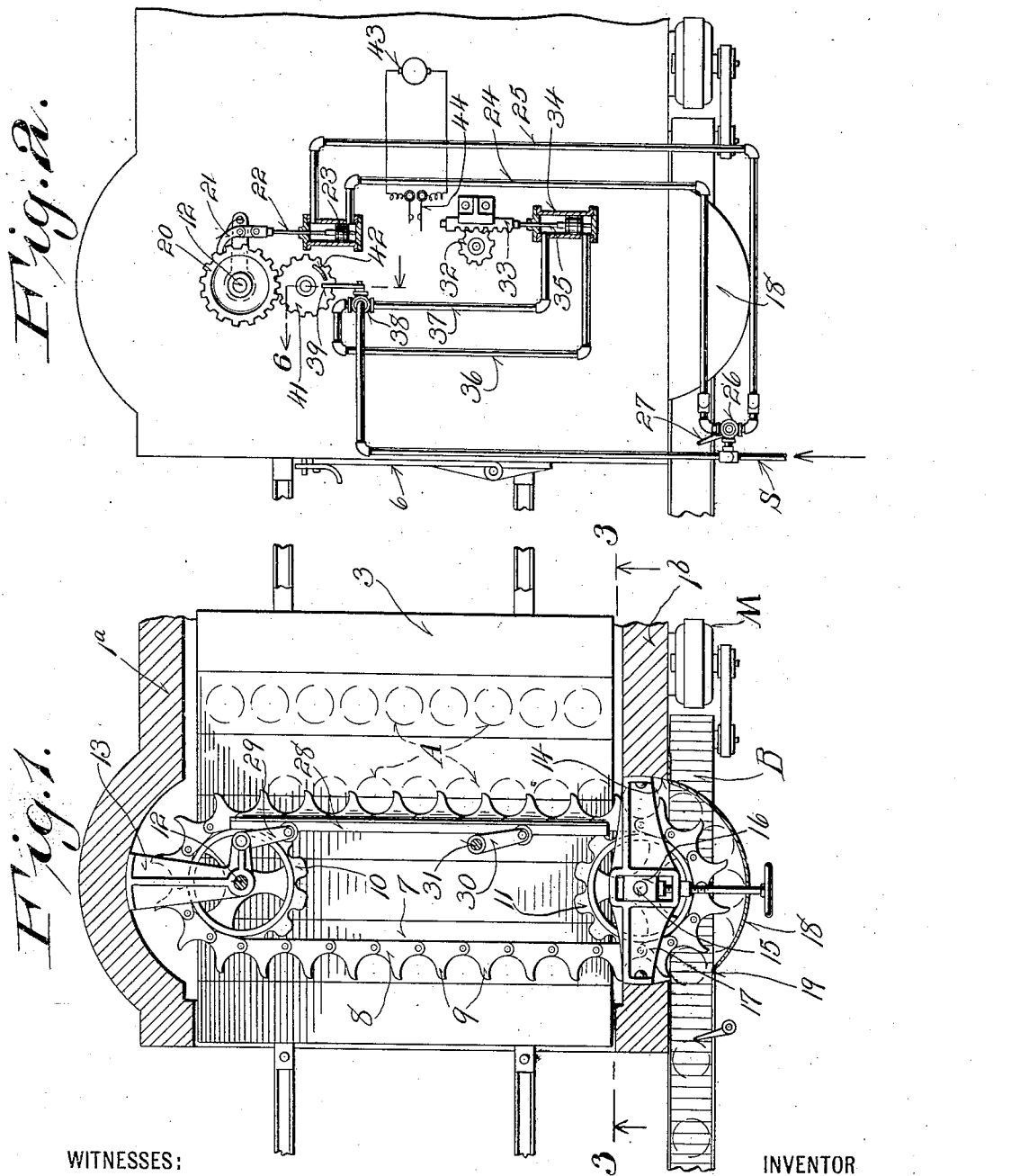

W. STENDER.
BOTTLE FEEDING MECHANISM FOR ANNEALING OVENS.
APPLICATION FILED JUNE 4, 1918.
1,339,834.
Patented May 11, 1920.
2 SHEETS—SHEET 2.
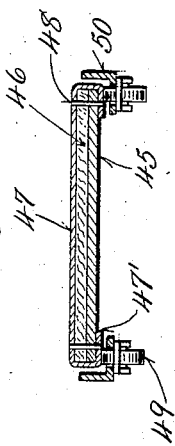
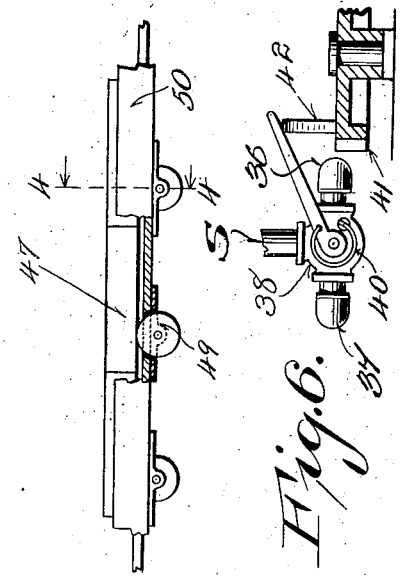
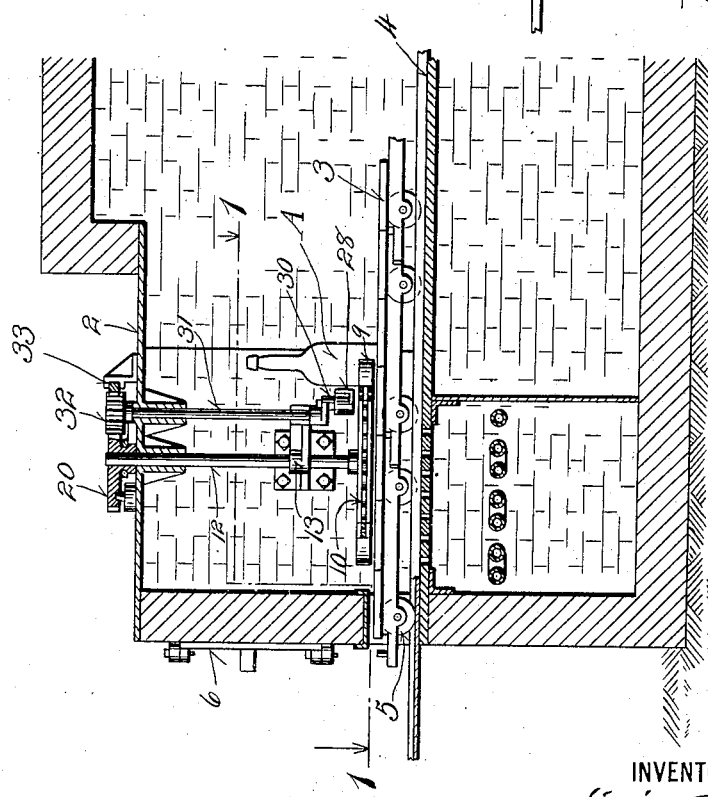
WITNESSES:
T. P. Britt
INVENTOR
William Stender
BY George Young
ATTORNEY

UNITED STATES PATENT OFFICE.

WILLIAM STENDER, OF MILWAUKEE, WISCONSIN.

BOTTLE-FEEDING MECHANISM FOR ANNEALING-OVENS.

1,339,834.
Specification of Letters Patent.
Patented May 11, 1920.

Application filed June 4, 1918. Serial No. 238,128.

*To all whom it may concern:*

Be it known that I, WILLIAM STENDER, a citizen of the United States, and resident of Milwaukee, in the county of Milwaukee and State of Wisconsin, have invented certain new and useful Improvements in Bottle-Feeding Mechanism for Annealing-Ovens; and I do hereby declare that the following is a full, clear, and exact description thereof.

This invention relates to new and useful improvements in annealing ovens, and particularly in the means for feeding bottles or the like delivered from a molding machine thereinto. In the general manner of construction and operation it is similar to the machine illustrated in my United States Patent No. 1,247,890 granted on Nov. 27, 1917.

It is the principal object of the invention to provide means for efficiently distributing bottles or the like on to the usual movable bed located within the oven.

It is further an object to provide an arrangement whereby the actuation of the movable bed is controlled by the mechanism which feeds the bottles thereon.

A still further object is to provide an improved conveyer belt for moving the bottles from the molding machine to the means for distributing the same to the annealing oven.

With these and other objects and advantages in view, the invention resides in the novel features of construction, combination and arrangement of parts which will be hereinafter more particularly described and claimed and shown in the drawings in which:

Figure 1 represents a horizontal sectional view through the forward end of an annealing oven constructed in accordance with my invention on line 1—1 of Fig. 3.

Fig. 2 is a plan view of the oven shown in Fig. 1.

Fig. 3 is a vertical longitudinal sectional view taken on the plane of the line 3—3 of Fig. 1.

Fig. 4 is an enlarged transverse sectional view on the line 4—4 of Fig. 5 showing partly the improved feed belt for conveying the heated bottles from the molding machine to the annealing oven.

Fig. 5 is a side elevational view, partly in section, of a fragment of the belt shown in Fig. 4 together with its supporting means, and Fig. 6 is a detail sectional view taken approximately on the plane of the line 6—6 of Fig. 2.

In the accompanying drawings I have illustrated an annealing oven of common design, the same being somewhat similar to that illustrated in the above referred to patent. It will be noted that the same includes a horizontally disposed journal plate 2 for closing the upper forward end, this plate being immediately above suitable mechanism for distributing bottles A to a longitudinally shiftable bed 3, the latter being mounted on a horizontal supporting floor 4 spaced above the bottom of the oven and positioned parallel thereto. Sections of the bed 3 are fed into the oven through an opening 5 in the front wall thereof, said wall also having an opening normally closed by a door 6. Bottles A or the like are fed into the oven, preferably directly from a molding machine (not shown), by means of an endless belt B and an article receiving member 7. The latter comprises an endless chain 8, from the outer side of the links of which extend arcuate fingers 9, the same being spaced apart to form article receiving pockets therebetween. The stretches of this endless chain are disposed horizontally and parallel to the bed 3, over which they move transversely of its direction of travel. Said endless chain 8 is retained in this relationship with the bed 3 and caused to move by being trained around gear wheels 10 and 11, the first mentioned gear wheel 10 being fixed to the lower end of a vertical shaft 12 journally mounted in the bearing of a bracket 13 and in the journal plate 2, said wheel being disposed inwardly of the oven and adjacent the wall 1ª thereof.

The other gear wheel 11, on the other hand, is journaled in an opening 14 formed in the wall 1ᵇ of the oven, it being secured to a shaft 15 which in turn is carried by a sliding journal block 16. This block 16 is adjustably mounted in a bracket 17 that spans the opening 14 and is secured to the opposite walls thereof; it is obvious that by shifting the block 16 either inwardly or outwardly of the oven, the endless chain 8 is tightened or slackened as may be desired.

In view of the disposition of the gear wheel 11 it is obvious that the fingers 9 of the article receiving member 7 will project beyond the wall 1ᵇ of the oven so that they may successively engage bottles A as they are moved theretoward on the belt B. The latter it will be noted is positioned close to the wall 1ᵇ of the oven and moves in the direction of travel of the bed 3, it being continuously moved by the operation of an electric motor or the like M. A hood 18 having an opening 19 in one side is positioned to cover the opening 14 and to provide a housing for the outwardly projecting portions of the article receiving member 7.

The endless chain 8 forming the major portion of the article receiving means 7 is caused to shift step by step and thus successively feed bottles A into the oven and on to the bed 3, by the intermittent rotation of the shaft 12, the upper end of which projects above the journal plate 2. A ratchet wheel or gear 20 is secured to this upper end of the shaft 12 and has a pivoted dog 21 disposed for coöperation therewith, said dog being carried by the end of a reciprocative rod 22, thus movement of said rod will necessarily rotate the gear 20 in one direction and thereby actuate the driving wheel 10 of the article receiving mechanism.

The rod 22 is a continuation of a piston rod which is movable in a fluid pressure cylinder 23, motive fluid being supplied thereto by any suitable source through pipes 24 and 25, one of said pipes entering said cylinder on each side of the piston thereof. The opposite ends of these pipes 24 and 25 are connected with a three-way valve 26 which in turn has a pipe S from the source of supply joined thereto. An operating arm 27 extends from the stem of the valve and is so normally positioned that motive fluid may enter the pipe 25 to hold the piston rod and the dog 21 in retracted position; however, when a bottle A strikes said operating arm 27, which is located over the belt B and in the path of movement of said bottles thereon, the valve 26 permits fluid to enter the cylinder 23 through the pipe 24 and thus project the piston rod 22 outwardly. After the passing of the bottle A the operating arm may be returned to its normal position by any preferred spring arrangement such as that depicted in Fig. 6.

By the opening and closing of the ports of the valve 26 which lead respectively to the pipes 24 and 25, and the intermittent rotation of the gear 20, the article receiving member 7 will be shifted step by step so that bottles A will be successively moved off of the belt B and on to the bed 3. After said member 7 has been actuated a predetermined number of steps, or in other words after a predetermined number of articles, such as the bottles A, have been received in the pockets between the fingers 9, means is operated for shifting said articles from their respective pockets on to the bed 3 and out of the path of movement of said fingers 9. This operation is procured through the instrumentality of an elongated bar in the form of a sweep arm 28 disposed over the innermost stretch of the endless chain 8 as shown in Fig. 1. One end of this sweep arm is supported by a link 29 which is pivoted to the bracket 13, while the other end portion thereof is pivotally connected to one end of a crank 30, the latter being fixed to a vertical shaft 31 journaled in the plate 2.

The upper end of this shaft 31 which projects above said plate 2 has a gear 32 fixed thereto, the teeth of which mesh with a rack 33. A piston cylinder 34 is located adjacent the rack 33 and the piston rod 35 of the piston thereof is connected with one end of said rack so that when the piston is shifted in opposite directions the rack will be similarly actuated. Such movement obviously causes the crank 30 to move the sweep arm 28 in the proper direction to discharge the bottles A or to return it to its inactive position.

Motive fluid pipes 36 and 37 extend from opposite ends of the cylinder 34 to a three-way valve 38, said valve also being connected with the pipe S. An operating arm 39 extends from the stem of said valve 38 and is normally retained in such a position by a spring 40 so as to permit motive fluid to enter the pipe 37 for the retraction of the piston rod 35. However, when the rack bar is to be shifted in a direction to cause the movement of the sweep arm to active position, the operating arm 39 is moved against the tension of said spring 40 and the passageways between the pipes S and 36 to permit motive fluid to enter the inner end of the cylinder 34. This is carried out at the proper time with respect to the step by step movement of the article receiving member by the provision of a gear 41, the teeth of which mesh with the teeth of the gear 20, and a cam 42 on the former gear.

As hereinbefore mentioned the bed 3 is intermittently shiftable whereby the rows of bottles A will be located close together to thus obviate the waste of space which would result if the bed was continually moving through the oven. The movement of the bed is procured by a motor 43 connected therewith in any preferred manner, said motor being illustrated in the present drawings diagrammatically for convenience in illustration; the same is actuated at the proper time by the closing of a normally open switch 44. From Fig. 2 it will be seen that the switch arms of this switch are so arranged that the movable one may be engaged by the end of the rack 33 when the same has been moved forwardly to its greatest extent. Immediately upon the retraction of the rack the switch 44 automatically opens and the motor 43 discontinues its operation.

The belt B which conveys the bottles from the molding machine to the annealing oven and which has been heretofore briefly referred to, is of improved design, it being so constructed that while it has a maximum of flexibility whereby it may be readily trained around suitable pulleys, it is also provided with means for preventing its deterioration through the application of hot bottles or other articles thereto. That is to say the same is formed of an endless flexible member 45, preferably of leather, a sheet 46 of asbestos or other insulating material disposed on its outer surface, and a plurality of metallic wear plates 47 covering the insulating material. From Fig. 4 it will be seen that these metallic plates 47 have their outer edges extended beyond the adjacent edges of the member 45 and the sheet 46 and that they are bent laterally and inwardly as at 47' around the longitudinal edges of the latter, rivets or the like 48 being extended through the bent-in portions of the plates and the other parts of the belt to retain the same together. The plates 47 are arranged edge to edge, but they are relatively narrow so that when the belt passes over a pulley its flexibility is not impaired.

The bent-in portions 47' of the plates 47 form tracks with which hollers 49 engage, the latter being carried by the horizontal flanges of a pair of spaced angle-iron guides 50. These guides are arranged parallel to the side of the wall 1ᵇ of the oven and direct and support the intermediate portions of the upper stretch of the belt B.

I claim:

1. A conveyer comprising a flexible belt, a sheet of insulating metal disposed on one side of said belt, a plurality of non-combustible plates disposed edge to edge on said sheet of insulating material, the outer edges of the plates being bent laterally and around the edges of the belt and sheet of insulating material and secured thereto.

2. The combination with a bottle annealing oven, of a feeding mechanism therefor comprising a flexible belt, a sheet of insulating material disposed on one surface of said belt, a plurality of non-combustible plates disposed edge to edge on said sheet of insulating material, the outer edges of the plates being bent laterally and around the edges of the belt and sheet of insulating material and secured thereto, and means for moving the belt.

In testimony that I claim the foregoing I have hereunto set my hand at Milwaukee, in the county of Milwaukee and State of Wisconsin.

WILLIAM STENDER.